US012612923B1

(12) United States Patent
Blair

(10) Patent No.: US 12,612,923 B1
(45) Date of Patent: Apr. 28, 2026

(54) CENTRIFUGAL COMPRESSOR IMPELLER WITH NONLINEAR BACKWALL

(71) Applicant: Ingersoll-Rand Industrial U.S., Inc., Davidson, NC (US)

(72) Inventor: Noel Blair, Grand Island, NY (US)

(73) Assignee: Ingersoll-Rand Industrial U.S., Inc., Davidson, NC (US)

(*) Notice: Subject to any disclaimer, the term of this patent is extended or adjusted under 35 U.S.C. 154(b) by 0 days.

(21) Appl. No.: 18/909,222

(22) Filed: Oct. 8, 2024

Related U.S. Application Data

(60) Continuation of application No. 18/496,191, filed on Oct. 27, 2023, now Pat. No. 12,110,902, which is a continuation of application No. 17/884,009, filed on Aug. 9, 2022, now Pat. No. 11,821,434, which is a division of application No. 16/709,442, filed on Dec. 10, 2019, now Pat. No. 11,408,434.

(51) Int. Cl.

| | |
|---|---|
| ***F04D 29/22*** | (2006.01) |
| ***F04D 17/10*** | (2006.01) |
| ***F04D 29/26*** | (2006.01) |
| ***F04D 29/28*** | (2006.01) |

(52) U.S. Cl.
CPC ......... *F04D 29/2216* (2013.01); *F04D 17/10* (2013.01); *F04D 29/266* (2013.01); *F04D 29/284* (2013.01); *F05B 2240/301* (2013.01); *F05B 2250/711* (2013.01)

(58) Field of Classification Search
None
See application file for complete search history.

(56) References Cited

U.S. PATENT DOCUMENTS 5,161,939 A 11/1992 Stadler
10,436,211 B2 10/2019 McArdle et al.
11,041,504 B2 6/2021 Tokuyama
(Continued)

FOREIGN PATENT DOCUMENTS

CN 201610860 U 10/2010
EP 3434908 A1 1/2019
(Continued)

OTHER PUBLICATIONS

Office Action from European Application No. 20212695.9, dated Oct. 30, 2024.
(Continued)

*Primary Examiner* — Sabbir Hasan
(74) *Attorney, Agent, or Firm* — Kevin E. West; Advent, LLP

(57) ABSTRACT

A centrifugal compressor impeller includes a plurality of blades on a front side that extend from a first axial side to an outer radial end of the impeller. The centrifugal impeller includes a back side having a nonlinear backwall. The backwall can include a flat area hear a bore of impeller, a flat area near a tip of the impeller, and a convex surface between the flat areas of the bore and the tip. In some forms the impeller further includes a concave surface between the convex surface and the tip to form an s-shape. A transition or inflection point can denote the change from convex to concave. The convex and/or concave surfaces can take any variety of forms such as constant radius sections and/or compound curves.

20 Claims, 3 Drawing Sheets

(56) References Cited

U.S. PATENT DOCUMENTS

| | | | | |
|---|---|---|---|---|
| 2008/0229742 | A1* | 9/2008 | Renaud | F04D 29/284 416/223 R |
| 2008/0298971 | A1 | 12/2008 | Pinzauti et al. | |
| 2015/0167467 | A1 | 6/2015 | Reyenga et al. | |
| 2019/0113048 | A1* | 4/2019 | Fujita | F04D 29/284 |

FOREIGN PATENT DOCUMENTS

| | | | | | |
|---|---|---|---|---|---|
| EP | 3434908 | B1 | | 10/2020 | |
| JP | H03141898 | A | | 6/1991 | |
| JP | 2002047944 | A | * | 2/2002 | F04D 29/662 |
| WO | 2006051285 | A1 | | 5/2006 | |
| WO | 2017168642 | A1 | | 10/2017 | |
| WO | 2018230714 | A1 | | 12/2018 | |

OTHER PUBLICATIONS

Australian Pump Technical Handbook, pp. 1-164, 2007, Pump Industry Australia Incorporated, Maryborough Australia.

Communication pursuant to Rule 114(2) EPC for Application No. 20212695.9, dated May 19, 2022.

Diener, Olaf, "Development of a Mixed-Flow Compressor Impeller for Micro Gas Turbine Application", Mar. 2016, Stellenbosch University, South Africa.

Extended European Search Report for European Patent Application No. 20212695.9, dated Apr. 12, 2021.

Office Action in Europe for Application No. 20212695.9, dated Mar. 20, 2023.

* cited by examiner

CENTRIFUGAL COMPRESSOR IMPELLER WITH NONLINEAR BACKWALL

CROSS-REFERENCE TO RELATED APPLICATIONS

The present application is a continuation of U.S. patent application Ser. No. 18/496,191, filed Oct. 27, 2023, and titled "CENTRIFUGAL COMPRESSOR IMPELLER WITH NONLINEAR BACKWALL", which is a continuation of U.S. patent application Ser. No. 17/884,009, now U.S. Pat. No. 11,821,434, filed Aug. 9, 2022, and titled "CENTRIFUGAL COMPRESSOR IMPELLER WITH NONLINEAR BACKWALL", which is a divisional under 35 U.S.C. § 120 of U.S. patent application Ser. No. 16/709,442, now U.S. Pat. No. 11,408,434, filed Dec. 10, 2019, and titled "CENTRIFUGAL COMPRESSOR IMPELLER WITH NONLINEAR BACKWALL." U.S. patent application Ser. No. 18/496,191, U.S. patent application Ser. No. 17/884,009 and U.S. patent application Ser. No. 16/709,442 are herein incorporated by reference in their entireties.

TECHNICAL FIELD

The present disclosure generally relates to centrifugal compressor impellers having nonlinear backwalls, and more particularly, but not exclusively, to centrifugal compressor impellers having backwalls with convex portions.

BACKGROUND

Providing improved stress and deflection performance on a centrifugal impeller remains an area of interest. Some existing systems have various shortcomings relative to certain applications. Accordingly, there remains a need for further contributions in this area of technology.

SUMMARY

One embodiment of the present disclosure is a unique centrifugal compressor impeller having at least a convex backwall. Other embodiments include apparatuses, systems, devices, hardware, methods, and combinations for shaping nonlinear backwalls on centrifugal compressor impellers. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
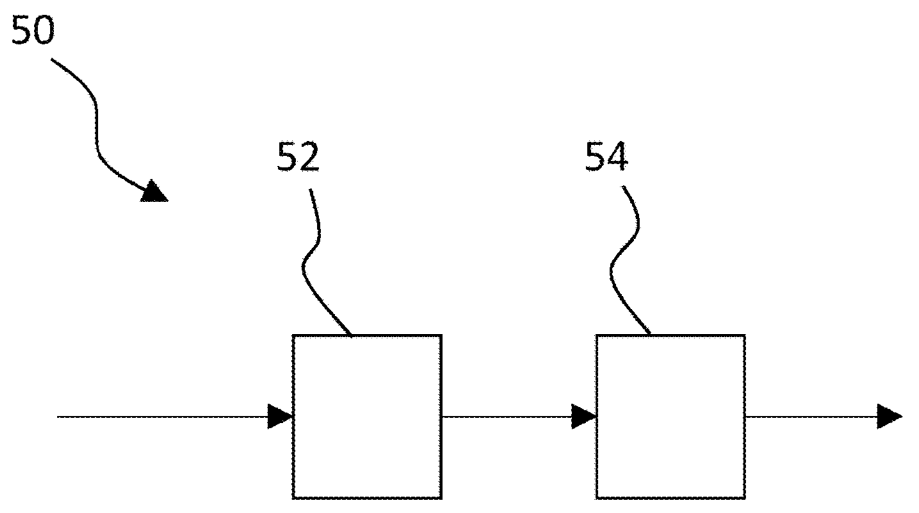
FIG. 1 illustrates a compressor system with centrifugal impeller.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a centrifugal compressor system 50 is shown which can be used to provide a pressurized flow of fluid for various applications, such as but not limited to various industrial applications. Centrifugal air compressors can be used in a variety of applications such as in plant air systems, process air systems, etc. For example, compressed air from a centrifugal compressor system can be used to supply a motive force for valve actuators and pneumatic cylinders used in robotic applications, as just a few nonlimiting examples.

The illustrated embodiment depicted in FIG. 1 includes a centrifugal compressor 52 and a cooler 54. Although only a single centrifugal compressor 52 is illustrated, other embodiments may include additional stages such that the cooler 54 is utilized as an intercooler between the compressor 52 and a downstream compression stage. The cooler 54 can include any variety of cooler types such as air/air cooler, air/water cooler, etc. No limitation is hereby intended regarding the type of cooler used in the centrifugal compressor system 50. Additional systems and/or components may also be used that are not illustrated for conciseness including a motive source to drive the centrifugal compressor 52 (e.g. electric, internal combustion engine, etc), filters and/or separators either upstream or downstream of the centrifugal compressor 52 for removing unwanted materials from the air flow, etc.

Figure 2:
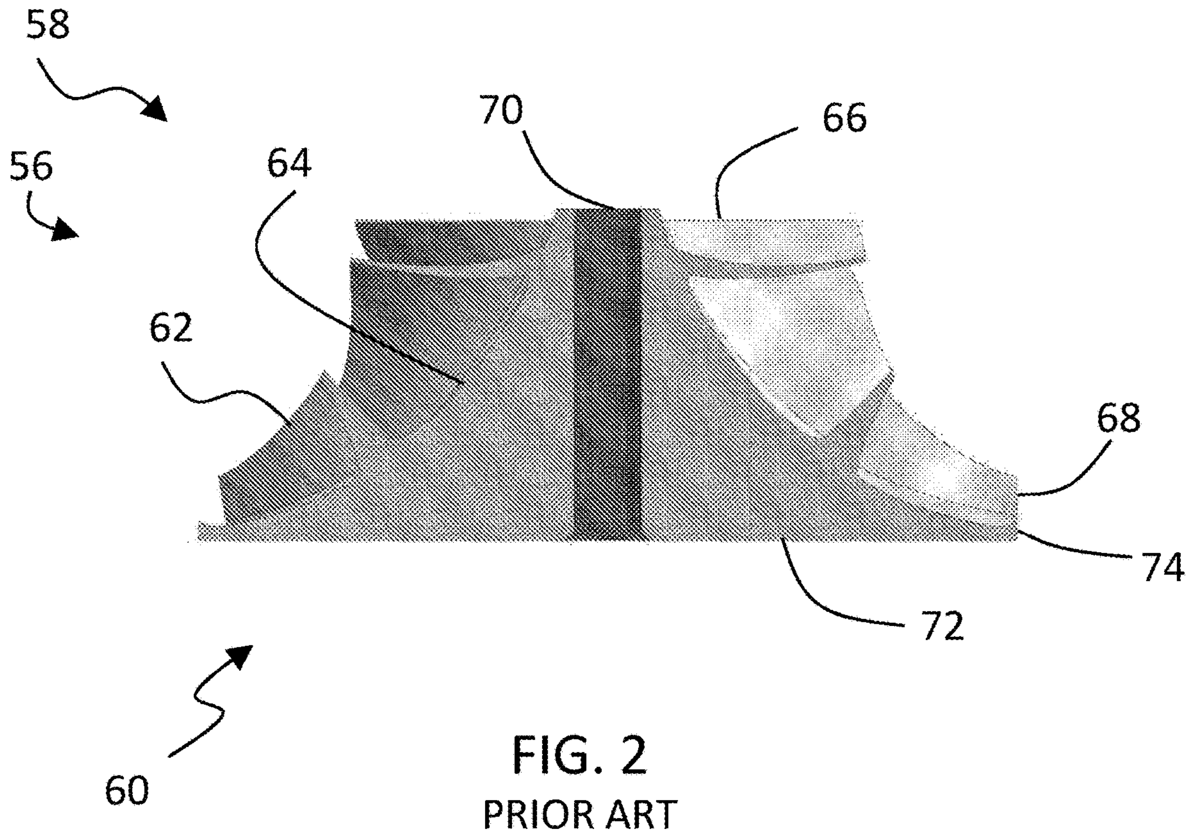
FIG. 2 PRIOR ART
FIG. 2 illustrates a prior art centrifugal impeller with flat backwall.

FIG. 2 illustrates a known impeller 56 of the centrifugal compressor 52, in which the impeller 56 includes a front side 58 and back side 60, in which the front side 58 includes a plurality of compressor blades 62 that extend from a hub 64 of the impeller 56. The impeller 56 can be made from a variety of materials, including but not limited to steel and titanium. For example, the impeller 56 can be made from stainless steel such as 15-5, and in other forms can be titanium alloy such as Ti64.

Although not illustrated, when the impeller 56 is installed in the compressor system 50 a shroud is located outward of the compressor blades 60 such that a flow path is defined between the shroud and the hub 64 of the compressor. In this installed configuration a flow path entrance 66 at an axial end to an outlet 68 at a radial end. The entrance 66 can take the form of an inducer and the outlet 68 of an exducer. As will be appreciated, as the impeller rotates, fluid entering in an axial direction at the entrance 66 is compressed to a higher total pressure and expelled in a circumferential and a radial direction through the outlet 68. In some forms a diffuser is situated to receive the compressed fluid exiting through the outlet 68. The diffuser can take any variety of form, and is usually sized to provide minimal gap and minimal step from the hub and shroud to the diffuser.

The impeller 56 includes a central bore 70 into which can be inserted any variety of useful mechanisms to connect the impeller 56 to a driven shaft of the centrifugal compressor 52. Such connections can include a threaded rod, a shaft that captures the impeller 56 through use of a connection, etc. No limitation is hereby intended of the connection type between impeller 56 and suitable prime mover (electric, internal combustion engine, etc) used to drive the impeller 56. Though the bore 70 is shown as being formed to fully extend between the front side 58 and back side 60, in some forms the bore 70 may only extend partially between the two, with an open end at either the front side 58 or back side 60. The back side 60 includes a flat, planar backwall 72 that extends between the bore 70 and a tip 74.

Figure 3:
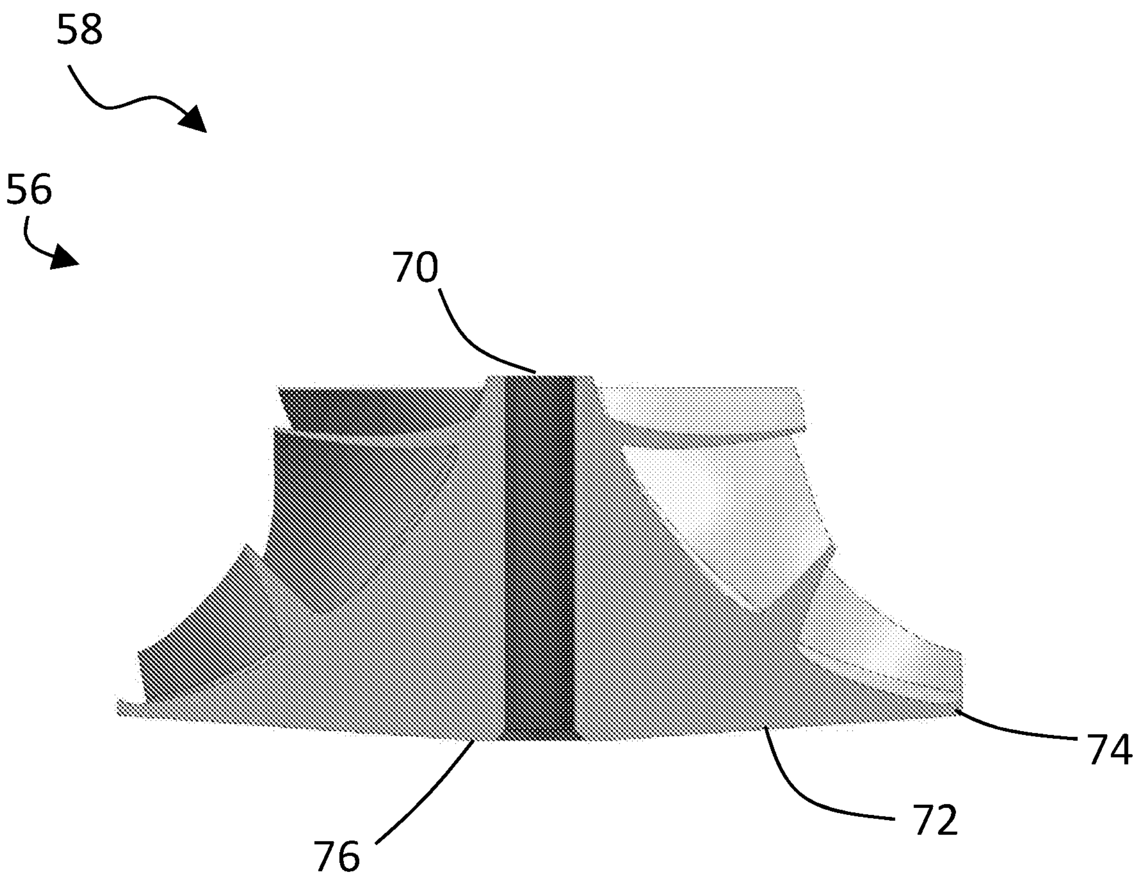
FIG. 3 illustrates a centrifugal impeller with nonlinear backwall.
Figure 4:
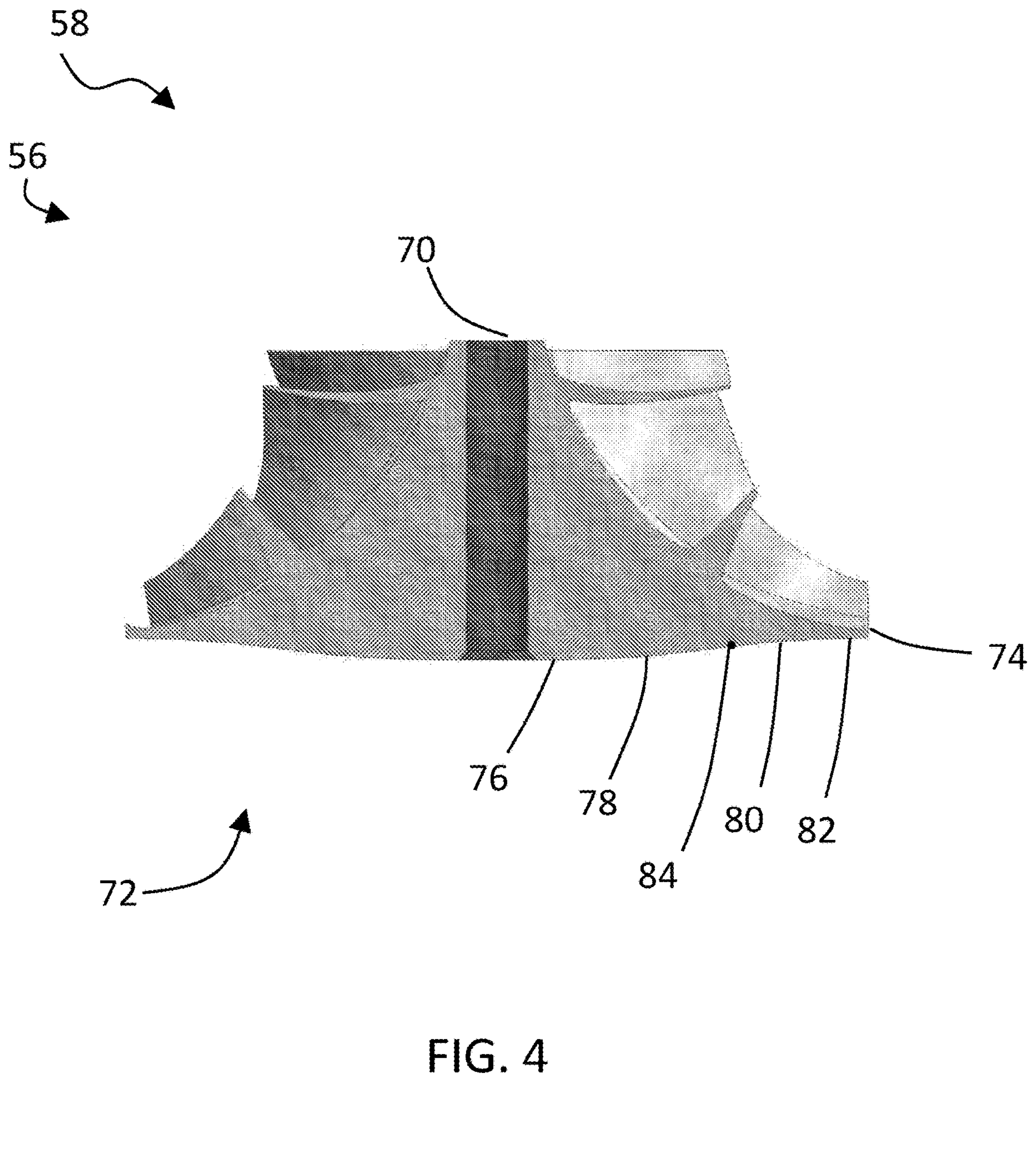
FIG. 4 illustrates a centrifugal impeller with nonlinear backwall.

Turning now to FIGS. 3 and 4, embodiments of an impeller disclosed herein are configured with a nonlinear shape of backwall 72 which provides reduced bore stress and reduced deflection (e.g. at the outlet) to provide heightened performance. In one form the nonlinear shapes disclosed herein reduce bore stress by about 30% relative to an impeller of equivalent mass, diameter, and speed, and also approximately 50% reduction in deflection (top and reference plane deflection). FIG. 3 illustrates an embodiment which includes a backwall 72 having a convex shape. The impeller 56 includes a flat area 76 that extends outward from the bore 70, after which the backwall 72 continues extending radially outward and also extends axially toward the front side 58 to form the convex shape. In one form the flat area 76 is planar. In one form the extension between the planar area 76 and the tip 74 continues in a flat shape such as a flat sided cone, but in others the convex shape can be rounded. In some forms the rounded shape can be take the form of a compound curve.

FIG. 4 illustrates a backwall 72 having a shape that includes a convex inner part 78, concave outer part 80, and outer flat area 82 near the tip 74. Similar to the flat area 76, the outer flat area 82 can be planar. A transition 84 denotes the change between the inner convex part 78 and the outer concave part 80. In some forms the flat area 76 can be about 20% of the distance between an axis of rotation and the tip 74. Alternatively and/or additionally, the transition 84 can occur at a location greater than at least 50% of the distance between the axis of rotation and the tip 74. Alternatively and/or additionally, the outer flat area 82 can extend to the tip 74 from a location past the transition point and from about 90% of the distance between the axis of rotation and the tip 74. Other dimensions are also contemplated. For example: the flat area 76 can be less than about 20% of the distance between an axis of rotation and the tip 74; alternatively and/or additionally the transition 84 can occur at a location below 50% of the distance between the axis of rotation and the tip 74; alternatively and/or additionally the outer flat area 82 can extend to the tip 74 from a location past the transition point and less than 90% of the distance between the axis of rotation and the tip 74. The various distances discussed above can be selectively paired on various embodiments such that various combinations are contemplated herein.

In some embodiments the convex inner part 78 and/or concave outer part 80 are defined by curves. Such curves can be a single radius curve that extends over the length of the inner part 78 and/or outer part 80, but in other forms the convex inner part 78 and/or concave outer part 80 are defined by compound curves. In still other forms the inner part 78 and/or outer part 80 can be defined by a Bezier spline. In some forms a radius of curvature of the inner part 78 at the transition 84 can be the same radius of curvature of the outer part 80 at the transition 84, but in other forms the radii can be different. In one nonlimiting form the radius of curvature of the inner part 78 at the transition 84 is smaller than the radius of curvature of the outer part 80 at the transition 84, but other embodiments may include a higher radius of curvature of the inner part at the transition 84 than the radius of curvature of the outer part 80 at the transition 84. As will be appreciated given the description herein, in some forms the transition 84 can be an inflection point denoting a change in the direction of curvature. The inflection point can in some forms denote a discontinuous change in the direction of curvature, but other forms can denote a continuous change in the direction of curvature. As will be appreciated, many of the shapes contemplated herein can be considered to result in an S-shaped backwall 72.

Other features can be present on either embodiment of FIG. 3 or 4, including a chamfer on the backwall 72 at the outlet, and additionally and/or alternatively a chamfer on the backwall 72 at the bore 70.

It will be appreciated in this technical area that the centrifugal impeller is a body of revolution, and as such when discussing the "flat," "planar," "convex," "concave," "nonlinear," "curved," etc features of any particular part (e.g. in the illustrations the reference lines are grouped to one side) that the features are circumferentially distributed in the impeller by nature of its body of revolution.

One aspect of the present disclosure includes an apparatus comprising a centrifugal impeller having a blade side and a backwall side, the backwall side having a backwall and a hub region configured with a bore to be affixed to a rotatable shaft, the blade side including a plurality of impeller blades that extend from a first axial end to a first radial end of the centrifugal impeller, the plurality of impeller blades configured to receive a working fluid in the first axial end, compress the working, and discharge the working fluid through the first radial end when the centrifugal impeller is being operated, the backwall of the centrifugal impeller defined by: a flat area that extends inward from an outermost radial extent of the centrifugal impeller to a first location; a flat area in the hub region that extends outward from an outer diameter of the bore to a second location; and a compound curve located between the first location and the second location.

A feature of the present disclosure includes wherein the compound curve is a curve having first radius of curvature in a radial inward region of the compound curve, and a curve having a second radius of curvature in a region radial outward of the radial inward region.

Another feature of the present disclosure includes wherein the compound curve is a convex curve at the first radius of curvature, and a concave curve at the second radius of curvature.

Yet another feature of the present disclosure includes wherein the compound curve includes an inflection point between a radial inward region of the compound curve and a radial outward region of the compound curve, the inflection point denoting a change in direction of the compound curve.

Still another feature of the present disclosure includes wherein the inflection point occurs at a location greater than 50% of the distance from a rotational axis of the centrifugal impeller to the outermost radial extent of the centrifugal impeller.

Yet still another feature of the present disclosure includes wherein the inflection point also marks a discontinuity between a radius of curvature of backwall as it transitions from the radial inward region to the radial outward region.

Still yet another feature of the present disclosure includes wherein the compound curve provides a lower bore stress, lower tip deflection, and lower out of reference plane deflection than an impeller with identical geometry and mass properties but with a flat backwall instead of a compound curve.

A further feature of the present disclosure includes wherein the centrifugal impeller includes an inducer at the first axial end and an exducer at the first radial end, and wherein the compound curve is a convex curve.

A still further feature of the present disclosure includes wherein the compound curve includes a concave curve at a location radially outward of the convex curve.

Another aspect of the present disclosure includes an apparatus comprising a centrifugal impeller having a plurality of blades on a first side and a backwall on a second side, the centrifugal impeller including an intake on a first axial end of the first side and an outlet on an outer radial end of the first side, the centrifugal impeller having a bore hole and a bore hole flat area on the back side surrounding the bore hole, the backwall also defined by a tip region flat area near the outer radial end, the backwall including a convex region defined by an outward projection of material located between the bore hole flat area and the tip region flat area.

A feature of the present disclosure includes wherein the centrifugal impeller also includes a concave region located radially outward of the convex region.

Another feature of the present disclosure includes wherein at least one of the concave region and convex region is defined by a compound curve.

Still another feature of the present disclosure includes wherein the convex region and concave region have different radius of curvatures proximate an inflection point that denotes the transition between the convex region and the concave region.

Yet another feature of the present disclosure includes wherein the inflection point is located at least 50% of the distance between an axis of rotation of the centrifugal impeller and a tip at the tip region flat area of the centrifugal impeller.

Still yet another feature of the present disclosure includes wherein at least one of the bore hole flat area and tip region flat area is planar.

Yet still another feature of the present disclosure includes wherein the centrifugal impeller also includes a concave region located radially outward of the convex region, and which further includes an inflection point denoting the transition between the convex region and concave region that is located at least 50% of the distance between an axis of rotation of the centrifugal impeller and a tip at the tip region flat area of the centrifugal impeller.

A further feature of the present disclosure includes wherein at least one of the convex region and concave region is a compound curve.

A still further feature of the present disclosure includes wherein the compound curve provides a lower bore stress, lower tip deflection, and lower out of reference plane deflection than an impeller with identical geometry and mass properties but with a flat backwall instead of a compound curve.

Yet another aspect of the present disclosure includes an apparatus comprising a centrifugal compressor impeller having a plurality of blades disposed on a front side and a backwall disposed on a back side, the backwall having a central flat area surrounding a bore of the centrifugal compressor impeller and a convex shape extending from the central flat area toward a tip of the centrifugal compressor impeller.

A feature of the present disclosure includes wherein the centrifugal compressor impeller also includes a flat area at the tip of the centrifugal compressor impeller.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:

a centrifugal impeller having a backwall side, the backwall side having a backwall and a hub region configured with a bore to be affixed to a rotatable shaft, the backwall of the centrifugal impeller defined by:

a flat area in the hub region that extends outward from an outer diameter of the bore to a first location; and a compound curve located between the first location and a second location in the centrifugal impeller, wherein the compound curve includes a concave curve at a location radially outward of a convex curve.

2. The apparatus of claim 1, wherein the compound curve is a curve having a first radius of curvature in a radial inward region of the compound curve, and a curve having a second radius of curvature in a region radial outward of the radial inward region.

3. The apparatus of claim 2, wherein the compound curve is a convex curve at the first radius of curvature, and a concave curve at the second radius of curvature.

4. The apparatus of claim 1, wherein the compound curve includes an inflection point between a radial inward region of the compound curve and a radial outward region of the compound curve, the inflection point denoting a change in direction of the compound curve.

5. The apparatus of claim 4, wherein the inflection point occurs at a location greater than 50% of the distance from a rotational axis of the centrifugal impeller to the outermost radial extent of the centrifugal impeller.

6. The apparatus of claim 5, wherein the inflection point also marks a discontinuity between a radius of curvature of the backwall as it transitions from the radial inward region to the radial outward region.

7. The apparatus of claim 6, wherein the compound curve provides a lower bore stress, lower tip deflection, and lower out of reference plane deflection than an impeller with identical geometry and mass properties but with a flat backwall instead of a compound curve.

8. The apparatus of claim 1, wherein the centrifugal impeller includes an inducer at the first axial end and an exducer at the first radial end, and wherein the compound curve is a convex curve.

9. An apparatus comprising:

a centrifugal impeller having a backwall side, the centrifugal impeller having a bore hole and a bore hole flat area on the backwall side surrounding the bore hole, the backwall defining a compound curve including a convex region and a concave region, the concave region located radially outward of the convex region.

10. The apparatus of claim 9, wherein the convex region and concave region have different radius of curvatures proximate an inflection point that denotes the transition between the convex region and the concave region.

11. The apparatus of claim 10, wherein the inflection point is located at least 50% of the distance between an axis of rotation of the centrifugal impeller and a tip of the centrifugal impeller.

12. The apparatus of claim 9, further including at least one of a bore hole flat area or a tip region flat area, wherein the at least one of the bore hole flat area or the tip region flat area is planar.

13. The apparatus of claim 12, wherein the centrifugal impeller also includes a concave region located radially outward of the convex region, and which further includes an inflection point denoting the transition between the convex region and concave region that is located at least 50% of the distance between an axis of rotation of the centrifugal impeller and a tip of the centrifugal impeller.

14. The apparatus of claim 13, wherein at least one of the convex region and concave region is a compound curve.

15. The apparatus of claim 14, wherein the compound curve provides a lower bore stress, lower tip deflection, and lower out of reference plane deflection than an impeller with identical geometry and mass properties but with a flat backwall instead of a compound curve.

16. An apparatus comprising:

a centrifugal compressor impeller having a backwall disposed on a back side, the backwall having a central area surrounding a bore of the centrifugal compressor impeller and a curvilinear extension extending from the central area toward a tip of the centrifugal compressor impeller, wherein the curvilinear extension extends radially outward and axially towards the front side, defining a convex region;

wherein the backwall defines a compound curve, the compound curve including a concave region located radially outward of the convex region.

17. The apparatus of claim 16, wherein the centrifugal compressor impeller also includes a flat area at the tip of the centrifugal compressor impeller.

18. The apparatus of claim 16, wherein the convex region and concave region have different radius of curvatures proximate an inflection point that denotes the transition between the convex region and the concave region.

19. The apparatus of claim 18, wherein the inflection point is located at least 50% of the distance between an axis of rotation of the centrifugal compressor impeller and the tip of the centrifugal impeller.

20. The apparatus of claim 16, wherein the compound curve is defined by a Bezier spline.

* * * * *